> 3,614,914
BOX SEALING MACHINE
John A. Troll, Ridgefield, Conn., assignor to
Iris Corporation
Filed July 31, 1969, Ser. No. 855,059
Int. Cl. B31b 1/00
U.S. Cl. 93—36 R 9 Claims

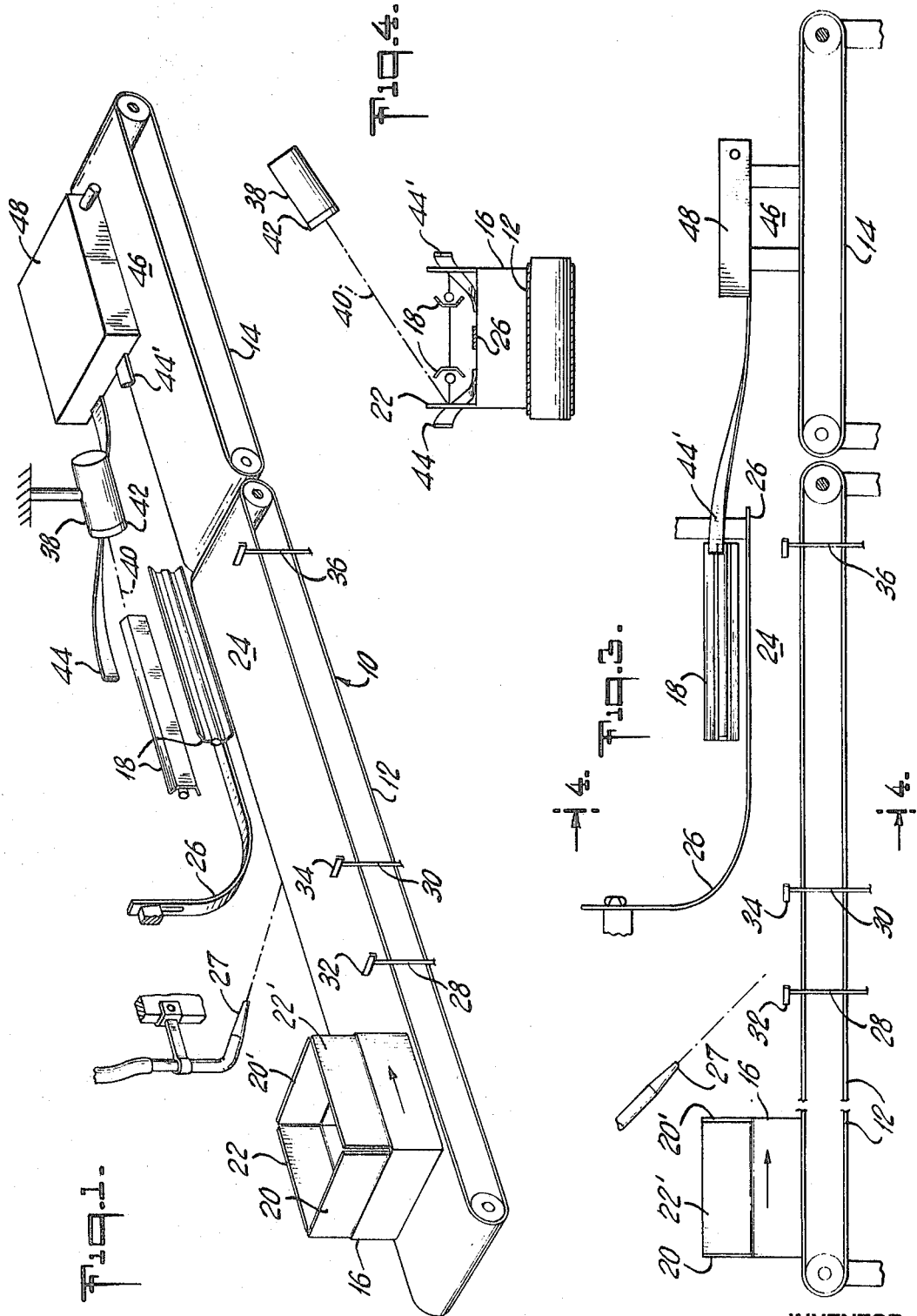

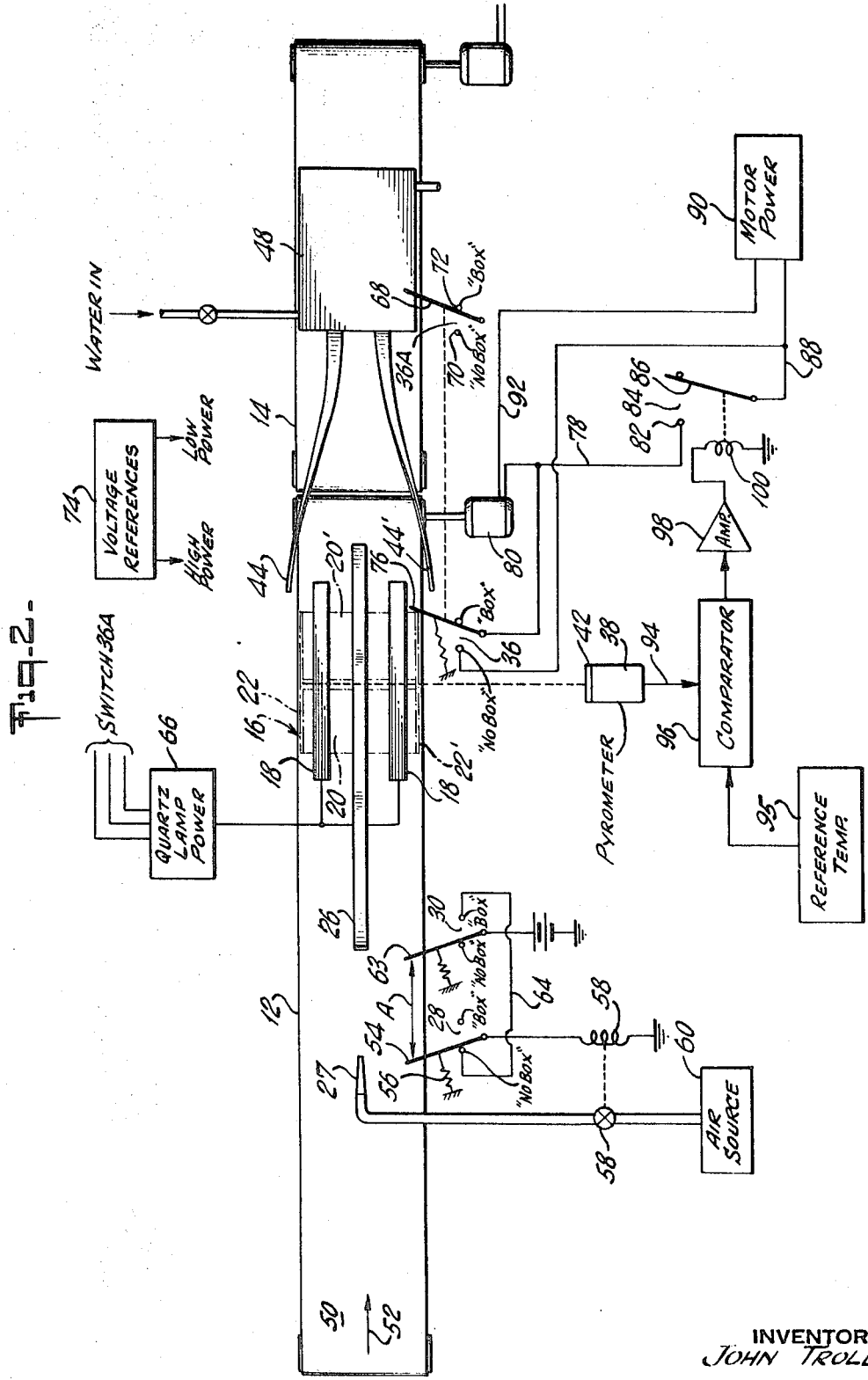

ABSTRACT OF THE DISCLOSURE

A novel sealing method and apparatus is described for the sealing of cardboard boxes. The boxes are coated with temperature sensitive sealer at at least the portion where a seal is to be made. The box portion is suitably heated with a source of radiation of a predominant wavelength range. A temperature sensor is employed which is sensitive to radiations outside the wavelength range of the source of radiation. The temperature sensor monitors the heated box portion and supplies a control signal when the desired temperature has been attained.

---

This invention relates to on automatic box-sealing apparatus. More specifically, it relates to an apparatus and method for heat-sealing cardboard boxes coated with heat-sensitive materials for sealing of the boxes.

In the sealing of boxes, a plurality of prior art methods may be employed such as the use of staples or tape which are unsatisfactory both in the speed of sealing of the boxes and in the quality of the seal. For instance, the stapled box tends to come apart even though the staples themselves are strong. The stapled box relies upon a strong metallic staple to provide a seal by actuating on a relatively small and consequently weak area of the cardboard material.

Another method of sealing boxes utilizes heat-sensitive materials which may be melted and thus seal the box as the material is absorbed by oppositely facing flap surfaces. Several problems have been encountered in the utilization of heat-sensitive materials. For instance, the cardboard box has a porosity which is relied upon to absorb a portion of the adhesive material when it is melted by a suitable heat source during the sealing of the box. Poor heat control is likely to cause excessive absorption of the melted material thus reducing the amount of sealing material available for adhesive contact. On the other hand, if one tends to reduce the absorption by preventing excessive melting of the adhesive such as by "under heating," then the adhesive does not adequately adhere to the surface to which it was applied in the first place, and furthermore does not penetrate sufficiently into the opposite surface with which the seal is to be made.

Although it would appear a simple matter to adjust the application of heat for any one box in such a way that just the right amount is applied to produce the desired melting, absorption and sealing, the fact of the matter is that the heat-sealing of boxes on a production line is not so easily controlled. Many variables must be considered, such as variations of porosity, heat control, thickness of the adhesive, rate of cooling, and conveyer speed control.

It is therefore an object of this invention to provide a method and apparatus for the heat-sealing of cardboard boxes.

It is a further object of this invention to provide a method and apparatus for the automatic heat-sealing of cardboard boxes with great efficiency and highly-reproducible performance.

It is a further object of this invention to provide a method and apparatus for heat-sealing of a cardboard box by employing an adhesive which is partially selectively absorbed by the boxes being sealed.

The above-mentioned and other features and objects of this invention and the manner of attaining them will become more apparent and the invention itself will best be understood by reference to the following description of an embodiment of the invention taken in conjunction with the accompanying drawings, the description of which follows.

FIG. 1 is a perspective view of a heat-sealing box apparatus incorporating this invention; and FIG. 2 is a top and schematic view of the heat-sealing cardboard box apparatus employing my invention.

FIG. 3 is a side view of the heat-sealing apparatus;

FIG. 4 is a sectional view of the heat-sealing apparatus along the line 4—4 in FIG. 3.

Briefly stated, my invention contemplates the heat-sealing of a box which has provided on selected portions thereof a heat-meltable or heat-sensitive material which is exposed to a source of heat to bring it to a heat-sealing temperature and sensing the temperature of the adhesive so that the box may be sealed with the adhesive in a condition for optimum sealing without excessive absorption by the cardboard material and without inadequate heating of the adhesive.

In FIG. 1, I have supplied a conveyer belt system 10 formed of two continuous aligned belts 12 and 14. The belt 12 is used to convey a cardboard box 16 past a heat source 18 for heating the carboard box 16 to the desired temperature. The box 16 is rectangular and is provided with a pair of inner flaps 20–20' and a pair of outer flaps 22–22'. The inner flaps 20–20' are first depressed and the outer flaps after heating by source 18 are folded over the inner flaps. The second conveyer 14 is used to accept the heated box to complete the sealing operation by automatically folding the heated outer flaps 22–22' and applying pressure thereto for a time sufficient to complete the sealing operation. Two conveyers are used because the first conveyer 12 operates in an intermittent fashion to allow flaps 22–22' to be heated by stopping the box 16 at a heating location and passing the heated box on to the second conveyer when the temperature of the adhesive used on the box has reached a preselected temperature. The second conveyer 14, however, operates continuously so that it will always accept a heated box for prompt sealing thereof within a time calculated to be needed before the adhesive on the box has had an opportunity to congeal.

It is to be realized, of course, that a single continuous-movement conveyer system could be employed, provided this is made sufficiently long. However, for the purpose of explaining the invention, the arrangement of FIG. 1 suffices. In fact, in some situations, a single interrupted-movement-type conveyor system can be employed wherein the pressurizing and folding of the flaps is performed on the same conveyer as that of the heating of the cardboard box. However, in the latter case, only one box can be present on the conveyer at any one time. My invention can be employed with any one of these various conveyer arrangements.

The cardboard box is preliminarily prepared with an adhesive which is heat-sensitive. This adhesive may be a plastic which is applied to all of the internal and external surfaces of the cardboard box for the purpose of hermetical sealing thereof and prevent its deterioration due to humidity. This plastic is coated on the outside of the box and generally has a melting temperature of about 260°. The plastic exhibits a variation in its viscosity with temperature, i.e. becoming thinner with increased temperatures. At about a temperature of 360°, the plastic will tend to become so fluid that it is excessively absorbed by the cardboard material. On the other hand, if the temperature is too low, say about 275° C., the plastic will be too rigid to properly adhere to the box surface by partial absorption. It is therefore necessary to heat the particular plastic, for instance, to a temperature somewhere in the range of between 300 and 350 degrees to properly prepare it for sealing of a box.

The temperature to which the box flaps 22–22' are to be raised is attained by controlling the duration of exposure. Although one could attempt to determine the duration of exposure on the basis of experimental results of a few boxes, experience has indicated that in practice there is no selected interval of time suitable for the sealing of all boxes. Apparently the thickness of the plastic coating and other local conditions unique to boxes sufficiently vary to result in an excessive number of rejects of sealed boxes where the heating time is fixed. According to my invention, I cause a parameter to be sensed which properly indicates the state of the adhesive or plastic during the heating thereof so that individual variations of boxes may be taken into account during the sealing operation, thus ensuring a high rate of well-sealed boxes.

As the box 16 is conveyed towards the heating station generally indicated at 24 the inner flaps 20–20' are depressed by a suitable mechanism. The forwardly located inner flap 20' is depressed by a central guide 26 which extends from a location before the heating station 24 to an aft location past the station 24. The inner flap 20' may be conventionally depressed by the guide 26. The rear flap 20, however, must be first leaned forwardly in order to be forwardly depressed by the central guide. This is accomplished by the use of an air blast from a nozzle 27 which is actuated under control from a pair of microswitches 28 and 30. The microswitches are provided with flapper actuators 32–34 to sense the proper positioning of the box 16 to initiate actuation of the air blast.

As the box 16 is conveyed to the heating location 24, a microswitch 36 senses the arrival of the box by its flapper actuator 38 and causes a halting of the conveyor. In this position, the outer flaps 22–22' are each located opposite a heating quartz lamp 18.

The quartz lamps operate continuously so that when the box 16 is halted at the heating location 24 the inner surface of the outer flaps 22–22' are quickly and immediately raised in temperature. A pyrometer 38 is employed to monitor the heated inner surface of flap 22. The pyrometer 38 has a wavelength of sensitivity different from that of the radiation produced by the quartz lamps. This assures that the pyrometer will not be responsive to reflected radiation from the quartz lamps but will only be responsive to radiations indicative of the surface temperature of the inner surface of the outer box flap. FIG. 4 shows the position of the pyrometer and its axis of sensitivity 40. The pyrometer as is well known provides an electrical signal representative of the magnitude of the radiation sensed by it.

Most quartz lamps produce radiations in the radiation passband from about 2 to 3 microns with virtually no radiation about 4 microns. The pyrometer, however, has been provided with a suitable optical filter 42 which excludes the radiations of wavelengths below, say, 6 microns. The heat absorption by the inner surface of the outer box flap 22, however, causes a re-radiation of energy within the sensitive range of the pyrometer. Since the magnitude of the re-radiation of energy is indicative of the amount of heat absorbed by the flap 22, the electrical signal from the pyrometer is employed to generate a control signal to terminate the heating operation when a preselected temperature has been attained. As soon as the selected temperature has been attained, the first conveyor 12 is energized to pass the heated box 16 on to the second conveyor 14 for depression and sealing of the outer box flaps 22–22' by guides 44–44'. The control guide 26 as is visible in the view of FIG. 3 maintains the inner flaps 20–20' in the depressed state until the guides 44–44' located over the second conveyor 14 sufficiently depress the outer box flaps 22–22' to keep the inner flaps down.

As the box moves on the conveyor 14 the outer flaps 22–22' are completely depressed before reaching a pressurizing and cooling station 46 which is made sufficiently long to assure a cooling of the outer box flaps 22–22' and thus a congealing of the adhesive and with sufficient pressure to assure a sealing with the inner flaps. It is to be understood that the inner flaps 20–20' are properly supported by the merchandise in the box 16 or other means to permit the pressurized sealing. For the sealing of, for instance, the bottom of an empty box other arrangements may be made. An empty box may have its bottom sealed by utilizing large overlapping outer flaps wherein the inner surface of one flap and the outer surface of the other flap are heated in accordance with my invention. The heater quartz lamps 18 are then suitably located relative to these flaps to heat them in the manner of my invention. The box, as it passes on to the second conveyor, moves continuously, and provision must be made to receive completely sealed boxes as they are sealed by the heat-sealing apparatus.

The cooling and pressurizing station 46 comprises a cooling plate 48 which is water-cooled to preferably maintain the plate 48 at a preselected temperature. The entire operation is so timed that from the time that the desired temperature is attained, the cooling and pressurizing occurs still within the sealing range of the adhesive employed.

It is realized, of course, that other than plastic seals may be employed, such as heat-sensitive glues and the like; however, the plastic material is especially advantageous in that it is generally applied to the raw material, i.e. the cardboard material before the box is made, thus both serving as a hermetic sealing substance as well as a substance for heat-sealing of the box.

With reference to FIG. 2, the first conveyor 12 is shown with a box loading area at 50. The nozzle 27 is located before the central guide 26 and is oriented parallel with the direction of travel of the first conveyor as indicated by arrow 52. The first microswitch 28 is schematically illustrated and is formed of a single-pole 54 actuated by the flapper 32 to form a two-position switch with a pair of contacts respectively labelled "box" and "not box." This labelling is indicative of the sensing by this microswitch of the presence of a box by the flapper 32. The switch 28 is normally retained in the "not box" position by a spring 56 and thus interconnects that "not box" contact with a coil of a relay 58 which actuates a valve 60 in series with a pressurized source of air 60 and the nozzle 27. The relay 58, when energized by a power supply source 62, will cause an opening of the valve with the result of a blast of air being directed in the direction of travel as indicated by the arrow 52. The microswitch 30 is provided with a pole 63 with two positions, one of which is labelled "box" with the pole normally held in the "not box" contact position by a spring 64. The pole 63 of the microswitch 30 is coupled to the D.C. power supply 62 and under proper conditions will supply electrical power for the relay 58.

The microswitches 28–30 are selectively spaced from one another as will be explained. When the first microswitch 28 senses the passage of a box, its flapper 32 will place the pole 54 in the box contact position. At some time thereafter, the second microswitch 30 will sense the presence of a box and place its pole 63 in contact with the box contact. If the distance A between the microswitches is less than the length of a box, there will be a small time period, depending upon the relative length of the space A and the box length L during which both of the microswitches will have their poles in the box position. As indicated by the electrical connecting line 64 between the box contact of the second microswitch 30 and the not-box contact of the first microswitch 28, no relay energization arises while the box is passing both microswitches 28–30.

Howver, when the rearward edge of the box passes the first microswitch 28, its pole 54 will return to the not-box contact and since the second microswitch 30 still senses the presence of a box, an electrical path is completed between the relay 58 and the power supply 62 to cause an energization of the relay 58. Energizing of the relay produces a blast of air from the nozzle 27 at the rear flap 20.

It is to be realized that the duration of the air blast is dependent upon the separation A of the first and second microswitches 28–30. The closer the spacing, the shorter the blast. The preferred spacing is determined by the force necessary to properly incline the rear flap 20 forwardly so that the central guide 26 may further depress that flap. When the rear edge of the box has passed both microswitches 28–30, the electrical circuit between the relay and the power supply is interrupted and the air blast from the nozzle terminates.

The quartz lamps radiate in a direction generally transverse to the direction of travel of the first conveyor 12. These quartz lamps are supplied power from a suitable source of supply 66 which is selected to maintain the quartz lamps preferably at a radiating level commensurate with that necessary for obtaining a long-service life. Generally, this requires some derated operation of the quartz lamps, i.e. a reduced amount of power supplied thereto, but the arrangement of the apparatus of this invention is admirably suited to accomplish this.

For instance, by sensing the absence of a box opposite the quartz lamps, one may reduce the power to the lamps to a level considered as a quiescent power level which may be somewhere between ¼ to ½ of the normally rated power for the lamps, resulting in a considerably longer service life. This may be accomplished by the third microswitch 36 which has a flapper for sensing the presence of a box opposite the heating location. The switch 36 comprises a double-pole, double-throw switch with a first pole 68 part of a switch 36A electrically connected to the power supply source for the quartz lamps and a pair of contacts 70–72 which supply different reference voltages for this power supply with contact 70 supplying a reference voltage sized commensurate with that necessary for establishing the quiescent power conditions, i.e. between ¼ to ½ the power, and the second contact 72 supplying a reference voltage for producing the necessary rated output power for quickly heating of the outer flaps. The reference voltages may be established in a network 74. For this reason, the first pole 68 is normally held in the "not-box" position until a box is located opposite the quartz lamps, at which the pole makes electrical contact with the "box" contact 72.

The switch 36 controls a second pole 76 which has a normally no-box contacting position and a box contact. The pole 76 is actuated by a box contacting flapper like that used with switches 28–30. The pole 76 is electrically coupled via lead 78 to one terminal on a motor 80. Motor 80 drives conveyor 12. Lead 78 is also coupled to a "desired temperature" contact 82 of a relay actuated single pole switch 84. A pole 86 of switch 84 is connected via lead 88 to the no-box contact of switch 36 and to one terminal of a motor power supply 90. Another lead 92 connects the motor power supply directly to the motor.

The switch 36 thus senses the presence of a box at the heating station 24 and interrupts the flow of power from the motor power supply 90 through lead 88, pole 76 and lead 78 to the motor 80. After the box has halted opposite the quartz lamps the box is moved again to the pressure sealing station 46 upon the sensing by pyrometer 38 of the proper temperature.

The pyrometer 38 monitors a region on the inner surface of the outer flap 22 and produces an output signal on lead 94 after suitable amplification. The pyrometer output signal is applied to a comparator circuit 96 which is a differential amplifier. Another input to the comparator circuit 96 is an electrical signal representative of a desired or reference temperature and is generated from a suitable variable reference source 98.

This reference temperature is that temperature which is considered necessary for the proper sealing of the cardboard boxes. The reference temperature is selected on the basis of experience, keeping in mind that cooling may arise after heating and before pressure sealing at station 46.

The reference temperature is selected to avoid excessive absorption by the cardboard boxes when the heat from the quartz lamps reduces the viscosity of the adhesive too much. Although a particular reference temperature can be determined for any one adhesive, it is to be realized that the reference temperature will vary depending upon the glue or adhesive employed and is likely to vary for different types of cardboard boxes. Generally for the plastic employed with the experiments with this invention, a temperature somewhere in the range of between 300° and 350° was found suitable.

Thus when the comparator circuit 96 senses that the pyrometer signal has reached the reference temperature signal or exceeds it, it produces an output control signal which, after suitable amplification in amplifier 99, actuates a relay 100. The relay 100 when actuated pulls the pole 86 into contact with contact 82 to re-start the conveyer 12. Relay 100 has a built-in delay so that once it has been energized it will not permit the pole 86 to disengage from contact 82 until the box has passed the flapper of switch 36. This delay assures that once the proper temperature has been reached the box is promptly conveyed away.

Reactivation of the motor 80 conveys the box quickly between and under the outer flap depressor guides 44 and passes the box underneath the water-cooled pressure sealer 48 which extends for a sufficiently long dimension along the conveyer 14 to properly cool the outer flaps and complete the sealing operation of a box.

It thus can be seen that my invention provides a novel heat-sealing apparatus. The quartz heating lamps are used in a spectral region which is chosen to be within a high absorptive region of the adhesive material for thorough heating thereof. Yet by choosing the sensitivity wavelength region of the pyrometer, the temperature of the adhesive may be monitored without destructive interference from the quartz lamps. The cooling apparatus employed on the second conveyer belt may be of the refrigerant type, where this is proven to be necessary, for instance, to balance effects from high conveyer speeds, and high heat absorption from the lamps.

The embodiment described herein heats the inner surfaces of the outer flaps by exposing them to quartz lamps of constant output power. It is conceivable to controllably vary the power to the quartz lamps to attain the desired adhesive temperature. Furthermore, instead of a speed-interrupted conveyer system, one could employ a continuously-moving conveyer wherein the quartz lamps are varied in output power once a box flap has reached the desired temperature. With a continuously moving conveyer 12, the heating station is "stretched" whereby a box is first heated by a preliminary lamp up to a temperature below the desired temperature and then raised to the final temperature by a terminal quartz lamp which has its power varied under control by the pyrometer.

While the principles of the invention have been described in connection with specific apparatus, it is to be clearly understood that this description is made only by way of example and not as a limitation to the scope of the invention as set forth in the objects thereof and in the accompanying claims.

I claim:

1. An apparatus for heat sealing of a box provided with a heat-sealable substance, comprising means for generating and directing a source of heat at a portion of the box having said heat-sealable substance to raise the temperature thereof to a level sufficient for heat-sealing of said portion, means for sensing the temperature of the box portion and producing a signal indicative thereof, means responsive to the sensed temperature signal for producing a control signal when the box portion temperature reaches a preselected maximum temperature level, and means responsive to the control signal for sealing said box portion.

2. An apparatus for heat-sealing cardboard boxes comprising means for generating and directing a source of heat within a selected wavelength region at a portion of the cardboard box to raise the temperature thereof to a level sufficient for heat-sealing of said box portion, means responsive to a selected electromagnetic wavelength region for sensing heat absorbed by the box portion and partially re-radiated thereby and producing a signal representative of the temperature of the box portion, with said heat source radiating heat energy substantially outside the wavelength responsive region of the temperature signal-producing means, means responsive to the temperature signal for producing a control signal when the box portion temperature reaches a preselected maximum desirable temperature level, and means responsive to the control signal for sealing said box portion.

3. The apparatus as recited in claim 2 and further comprising a conveyer for passing cardboard boxes past the source of heat, means for sensing the arrival of a box opposite said heat source, and producing a first signal indicative thereof, means responsive to said first signal for halting the conveyer, and means responsive to the control signal for restarting said conveyer to convey said box to the sealing means.

4. The apparatus as recited in claim 3 and further including means producing a low heat power and a high heat power indicating signal respectively representative of low and high heating output levels from the heat source means, means actuated by the first signal for applying the high power indicating signal to the heat source means while said box is located opposite thereto and applying the low power indicating signal to the heat source in the absence of a box opposite the heat source means.

5. The apparatus as recited in claim 3 wherein sealing means comprises a continuously moving second conveyer aligned with the first conveyer to receive boxes therefrom, a cooled pressure flap sealer arranged over the second conveyer to seal heated box portions.

6. The apparatus as recited in claim 2 wherein the box to be sealed is rectangular having an inner forward flap, an inner rearward flap and a pair of oppositely disposed outer flaps with the flaps located in normally upright positions, means for sensing the position of the inner rearward flap of a box at a selected location along the conveyer and producing a second signal indicative thereof, and means actuated by the second signal for producing a burst of air at the inner rearward flap in a direction along the movement of the conveyer, said burst of air being sufficient to incline the rearward flap in a forward direction and means for depressing said inner flaps.

7. The apparatus as recited in claim 6 and further comprising a pressurized source of air, a nozzle disposed to direct said blast of air forwardly and downwardly along the conveyer, an air line interconnecting the source of air to the nozzle, a valve disposed in the air line and a relay for controlling said valve, said relay being actuated by the second control signal.

8. The apparatus as recited in claim 7 wherein said second signal producing means comprises first and second box sensing switches disposed along the conveyer and being selectively interconnected to provide said second signal, with the spacing between the first and second switches being selected commensurate with a desired air burst duration.

9. The apparatus as receited in claim 2 wherein the source of heat radiates primarily at wavelengths below 4 microns and where said heat sensing means is responsive to radiations at wavelengths above said 4 microns.

References Cited

UNITED STATES PATENTS

| | | | |
|---|---|---|---|
| 2,669,815 | 2/1954 | Zinn et al. | 53—375 X |
| 3,201,915 | 8/1965 | Yanulaitis. | |
| 3,242,026 | 3/1966 | Saxton et al. | 156—272 |

BERNARD STICKNEY, Primary Examiner

U.S. Cl. X.R.

53—375; 93—49 R; 156—272